June 4, 1957 P. D. VAN DER KNAAP ET AL 2,794,914
CIRCUIT FOR SEPARATING PULSATORY SIGNALS
Filed Feb. 24, 1953
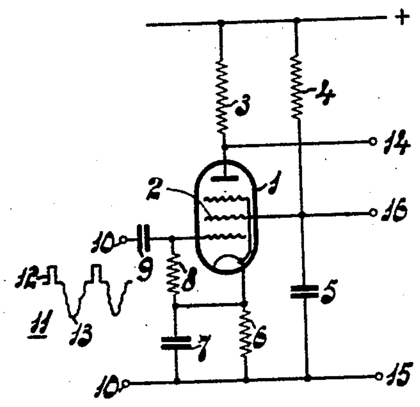
INVENTORS
PIETER DANIEL VAN DER KNAAP
ANTONIUS BOEKHORST
BY
AGENT

United States Patent Office 2,794,914

Patented June 4, 1957

2,794,914

CIRCUIT FOR SEPARATING PULSATORY SIGNALS

Pieter Daniel Van Der Knaap and Antonius Boekhorst, Eindhoven, Netherlands, assignors, by mesne assignments, to North American Philips Company, Inc., New York, N. Y., a corporation of Delaware Application February 24, 1953, Serial No. 338,521

Claims priority, application Netherlands February 29, 1952

1 Claim. (Cl. 250—27)

This invention relates to a circuit for separating two pulsatory signals having different pulse repetition frequencies, more particularly for separating the horizontal and vertical synchronizing pulses in a television signal, the pulse mixture being supplied to the control grid of a discharge tube.

With the majority of known circuits of the above-mentioned kind, such as are frequently used in television receivers, complete separation between the horizontal and vertical synchronizing pulses does not occur since often the total pulse mixture, which consequently comprises both the horizontal and vertical pulses, is adapted to be supplied as a whole to the horizontal deflecting circuit since the latter is not sensitive to the occurrence of vertical synchronizing pulses.

However, with vertical synchronization, the vertical pulses should generally be separated from the mixture.

The circuit according to the invention has for its object to provide in a simple manner entire separation so that on the one hand only the horizontal synchronizing signal and on the other only the vertical synchronizing signal is set up, it being otherwise obvious that the circuit according to the invention may be used for purposes other than television receivers.

The circuit according to the invention is characterized in that it includes a negative feed-back circuit which in practice is only effective for the pulsatory signals having the lowest pulse-repetition frequency.

The invention will now be described with reference to the accompanying drawing, in which one embodiment is given by way of example.

Referring to the drawing, 1 designates a discharge tube which is realized as a screen grid valve having a screen grid 2. The anode circuit includes a resistor 3 and the screen grid circuit includes a resistor 4. A capacitor 5 is connected in parallel with the screen grid circuit. The cathode lead of the tube includes a resistor 6 shunted by a capacitor 7. A resistor 8 is connected between the control grid and the cathode and the control grid circuit is connected via capacitor 9 across the input terminals 10. These input terminals have supplied to them a television signal 11, comprising positively directed synchronising pulses 12 and a negatively directed image signal 13.

Grid current limitation has the effect of securing in known manner a separation between the synchronizing signals and the image signal at the control grid of the tube so that the tube 1 is only permitted to pass current during the occurrence of synchronizing pulses. This would result in the occurrence across the resistor 3 of an intensified pulse mixture which would comprise both the vertical and the horizontal synchronizing pulses.

However, the tube 1 is negatively fed back due to the presence of the resistors 4 and 6 and this negative feed-back is only effective at low frequencies since the capacities of the capacitors 5 and 7 are such that the reactances of these capacitors at high-frequencies and hence at the repetition frequency of the horizontal synchronizing pulses and its harmonics are low as compared with the resistances of the resistors 4 and 6, respectively. Said capacities have otherwise such values that at least for the repetition frequency of the vertical synchronizing pulses the reactances are of the order of the resistances of the resistors 4 and 6, respectively.

During the occurrence of the horizontal synchronizing pulses there is consequently hardly any negative feed-back, whereas during the occurrence of the vertical synchronizing pulses considerable negative feed-back is provided.

This results in that there is set up across the anode resistor 3 only the horizontal synchronizing signal which may be obtained from the output terminals 14, 15.

The vertical synchronizing signal may be subtracted, for example, from the output terminals 16, 15.

While we have thus described our invention with specific examples and embodiments thereof, other modifications will be readily apparent to those skilled in the art without departing from the spirit and the scope of the invention as defined in the appended claim.

What is claimed is:

A pulse separation circuit for separating from a composite signal a pulsatory signal having a relatively high pulse repetition frequency and a pulsatory signal having a relatively low pulse repetition frequency, comprising an electron discharge device having a cathode, a control grid, a screen grid and an anode, a source of said composite signal connected to said control grid, a control grid resistor connected between said control grid and said cathode, a source of voltage having positive and negative terminals, an anode resistor connected between said anode and said positive terminal, a screen grid resistor connected between said screen grid and said positive terminal, a cathode resistor connected between said cathode and said negative terminal, a first capacitor connected between said screen grid and said negative terminal and having a value of capacitance to provide a reactance substantially equal to the value of said screen grid resistor at said relatively low frequency, a second capacitor connected electrically in parallel with said cathode resistor and having a value of capacitance to provide a reactance substantially equal to the value of said cathode resistor at said relatively low frequency, whereby said values of capacitors cause a negative feedback to occur at said relatively low frequency and substantially prevent negative feedback from occurring at said relatively high frequency, an electrical connection connected to said anode thereby to derive only said relatively high repetition frequency pulses therefrom, and an electrical connection connected to said screen grid thereby to derive only said relatively low repetition frequency pulses therefrom.

References Cited in the file of this patent

UNITED STATES PATENTS

| | | |
|---|---|---|
| 2,493,353 | Kuperus | Jan. 3, 1950 |
| 2,509,975 | Janssen | May 30, 1950 |
| 2,546,972 | Chatterjea et al. | Apr. 3, 1951 |

FOREIGN PATENTS

| | | |
|---|---|---|
| 75,541 | Norway | Sept. 5, 1949 |